United States Patent [19]
Izawa

[11] Patent Number: 5,471,205
[45] Date of Patent: Nov. 28, 1995

[54] MAP DISPLAYING METHOD

[76] Inventor: Michio Izawa, 6-15-408 Tsunashimahigashi 3-chome, Kohoku-ku, Yokohama, Kanagawa, Japan

[21] Appl. No.: 297,549

[22] Filed: Aug. 31, 1994

[51] Int. Cl.⁶ .................................. G08G 1/123
[52] U.S. Cl. ................ 340/995; 340/990; 340/994; 340/988; 364/444; 364/449
[58] Field of Search ......................... 340/990, 995, 340/988, 994; 364/449, 518, 444

[56] References Cited

U.S. PATENT DOCUMENTS

| | | | |
|---|---|---|---|
| 4,419,079 | 12/1983 | Georges et al. | 340/995 |
| 4,845,631 | 7/1989 | Bottorf | 340/995 |
| 4,893,127 | 1/1990 | Clark et al. | 340/995 |
| 4,974,170 | 11/1990 | Bouve et al. | 340/995 |
| 5,212,643 | 5/1993 | Yoshida | 340/995 |
| 5,293,163 | 3/1994 | Kakihara et al. | 340/995 |

*Primary Examiner*—John K. Peng
*Assistant Examiner*—Benjamin C. Lee
*Attorney, Agent, or Firm*—Rogers & Killeen

[57] ABSTRACT

A display method for displaying one or more of the current point, the target point, or objective point on a display screen, the method suppressing a display of useless background and offering sufficient background for visual and geographical recognition of the displayed point. When displaying a map of an area about a display point, the displayed area is defined by a circular region having a predetermined radius and a fan-shaped region which spreads at a predetermined angle from a path to be followed by the current point.

19 Claims, 7 Drawing Sheets

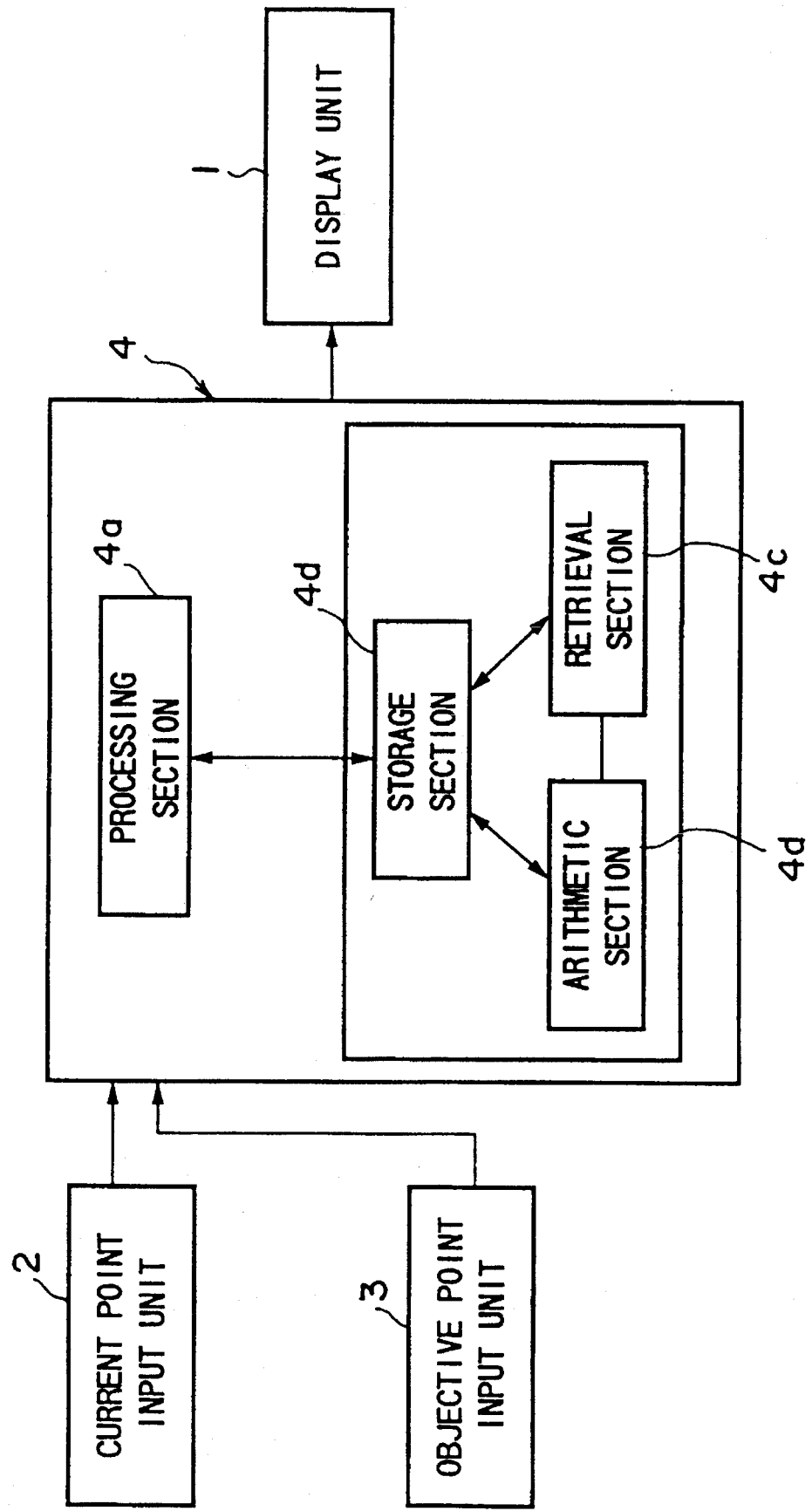

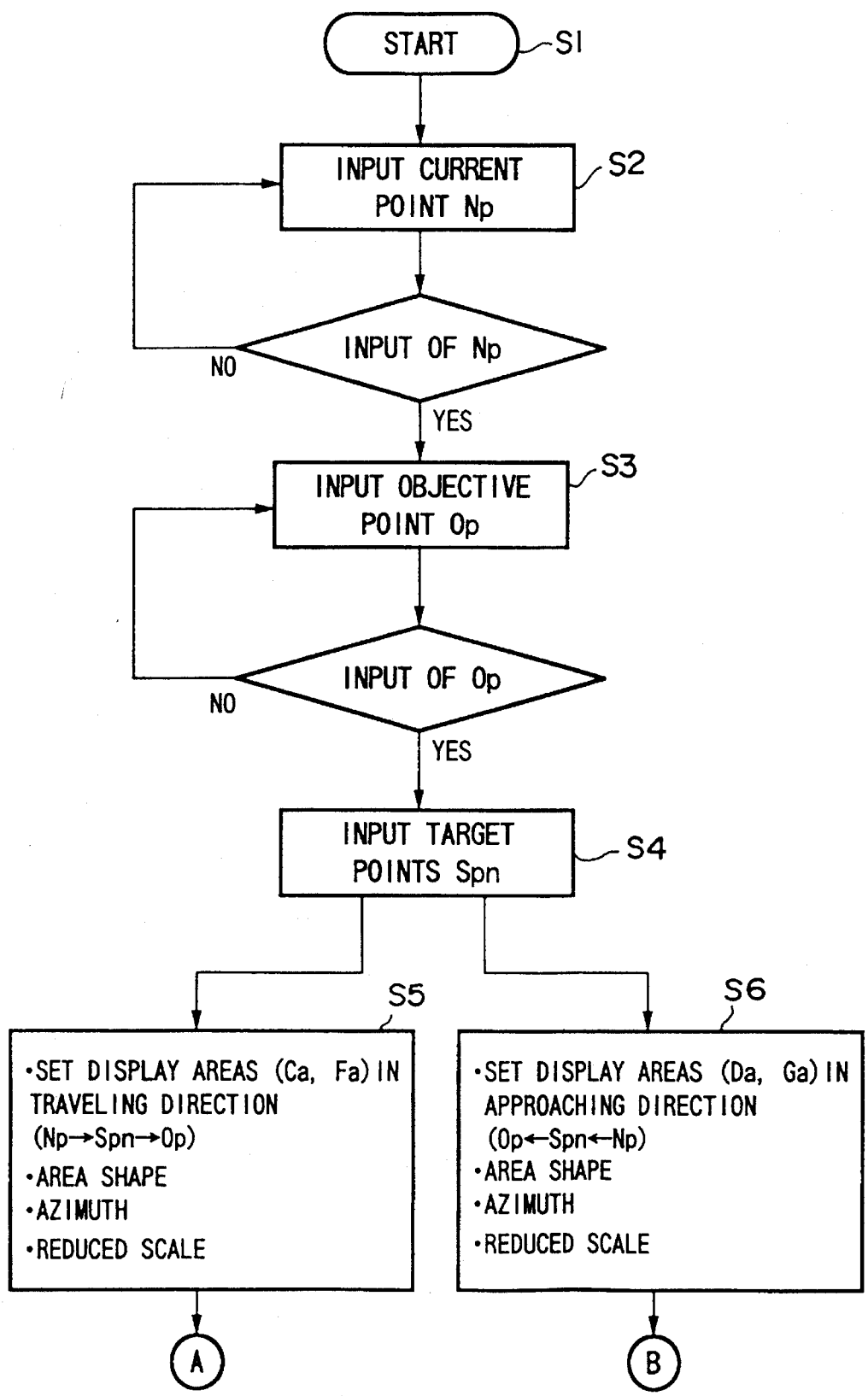

MAP DISPLAYING METHOD

FIELD OF THE INVENTION

The present invention relates to a method of displaying map information which method is particularly useful for use in map display of a car navigation system, for example.

DESCRIPTION OF THE RELATED ART

Existing car navigation systems have problems in allowing a driver to easily perceive map information indicated on a display unit, the manner of presenting so-called intermediate information (such as traffic jams and accidents), and how to ensure safety driving while the driver is looking at or hearing the information. As one method of solving the above problems, it has been tried to make the driver recognize map information, etc. by utilizing the sense of hearing as well as the sense of vision of the driver. In practice, however, there is a problem of disturbing judgment of the driver on the current situation to be given with priority and jeopardizing safety driving, because an actual space that is recognized and grasped by the visual, acoustic or bodily sensation of the driver while driving a motor vehicle may be often mingled with a virtual space combinationally and successively indicated based on information to the sense of vision and/or hearing of the driver.

In particular, presenting immediate information, etc. to the sense of hearing of a person has problems that the presentation is temporary, the presented information tend to be recognized by the driver as a forcible or imperative instruction, and voice information is very hard for the driver to hear while concentrating attention on the driving. On the other hand, visual display is more advantageous than temporary presentation of voice information in that display of the information to be presented can be held for a required period of time, and allows the driver to relatively easily select or judge another possible route by referring to the display. Accordingly, information is mainly presented by means of visual display in existing car navigation systems.

Map display for car navigation is effected as follows. A map of the desired area is displayed all over a substantially rectangular display screen of a liquid crystal or CRT, and the current point and the target or objective point are indicated in the form of an arrow, a circle or the like in superposed relationship on map information of the displayed area. Maps of the same area to be displayed on a plurality of reduced scales are prepared in advance, and one of the maps on any desired reduced scale can be selectively displayed.

With the conventional display modes, the current point and the objective point can be displayed on the same picture, but an amount of information is excessive because not only map information about surrounding areas of both the points, but also map information about other areas within the displayed picture than both the points and the surrounding areas are displayed at the same level. To easily and promptly find or set a rational route from the current point to the objective point or a passage point on the way, therefore, the driver is required to get used to the map display including the excessive amount of information and to be experienced in reading the map.

Thus, according to the map display by the conventional car navigation systems, even when limited areas surrounding the current point to the objective point are displayed in an enlarged mode, the map is always displayed all over the rectangular screen and the driver must view an entirety of the display while driving a motor vehicle, which gives rise to a problem in safety. Also since unnecessary areas displayed as background information is too much, it is practically impossible to perceive information at a glance that is necessary and sufficient to view and grasp the objective road, equipment or the like, with regard to information about the current point and the objective point to be viewed and grasped promptly and precisely, the surroundings of both the points, as well as intermediate places on the way to the objective point.

SUMMARY OF THE INVENTION

In view of the above-described display mode of map information on the rectangular display screen employed in the existing car navigation, an object of the present invention is to provide a display method for displaying the current point or the target or objective point, or the current point and the target or objective point on a rectangular display screen, which method can suppress display of useless background or surrounding information, and can offer background or surrounding information necessary and sufficient for visual and geographical recognition of the current point and the objective point at a glance, or can take a display mode necessary and sufficient for visual and geographical recognition related to the current point and the objective point.

To achieve the above object, according to the present invention, there is provided a map display method wherein, when displaying a map of a desired area on a display screen of a liquid crystal or CRT, the current point and the target or objective point for navigation display, or the current point or the target or objective point for navigation display is displayed such that a display area for the current point is defined by a circular region having a predetermined radius and a fan-shaped region which spreads at a predetermined central angle from the current point toward the target or objective point and has substantially the form of a fan or an inverted-triangle, map information included in the display area of the current point being displayed on the display screen, and a display area for the objective point is defined by a circular region having a predetermined radius and an inverted-fan-shaped region which spreads at a predetermined central angle from the objective point toward the current point and has substantially the form of an inverted-fan or a triangle, map information included in the display area of the objective point being also displayed on the display screen.

A display region of the current point is limited to the circular region having a predetermined radius with the current point at the center and a substantially fan-shaped region spreading from the current point toward the objective point, and the map information about only the region through which a driver will possible pass is displayed on the screen when the driver travels from the current point toward the objective point. Therefore, only the map information about the current point and the background thereof in the area spreading with directivity corresponding to the region through which the moving current will possible pass later, or only the map information about the objective point and the background thereof in the area spreading in the direction in which the moving current point will possibly approach the objective point as viewed therefrom is displayed on the display screen. As a result, since excessive map information is not displayed all over the display screen, the map information can be displayed in an easily readable and discernible manner for visual recognition of the current point, the objective point, or geographical situations surrounding these points.

BRIEF DESCRIPTION OF THE DRAWINGS

FIG. 8 is a functional block diagram of one example of a system for practicing the method of the present invention.

DETAILED DESCRIPTION OF THE PREFERRED EMBODIMENTS

Figure 1:
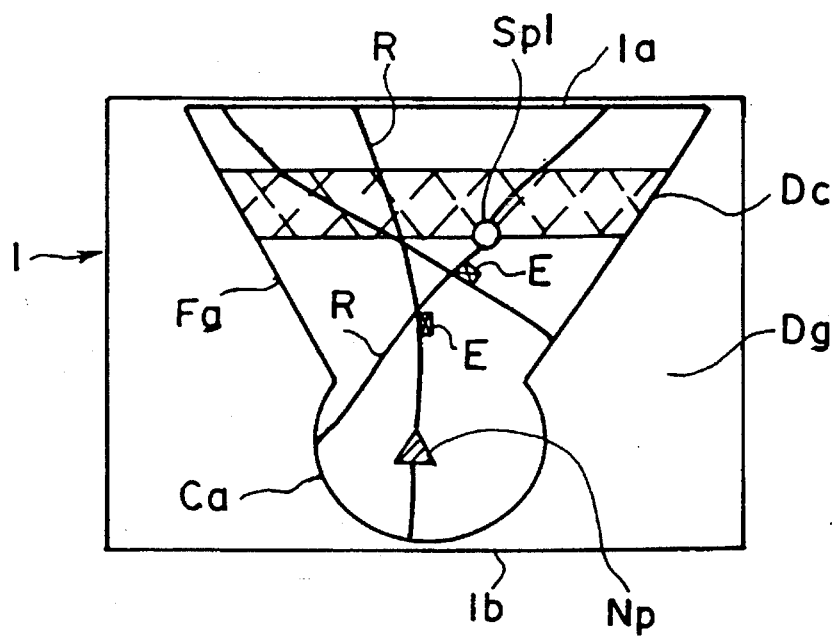
FIG. 1 is a front view showing a display example of the current point according to a method of the present invention.
Figure 3:
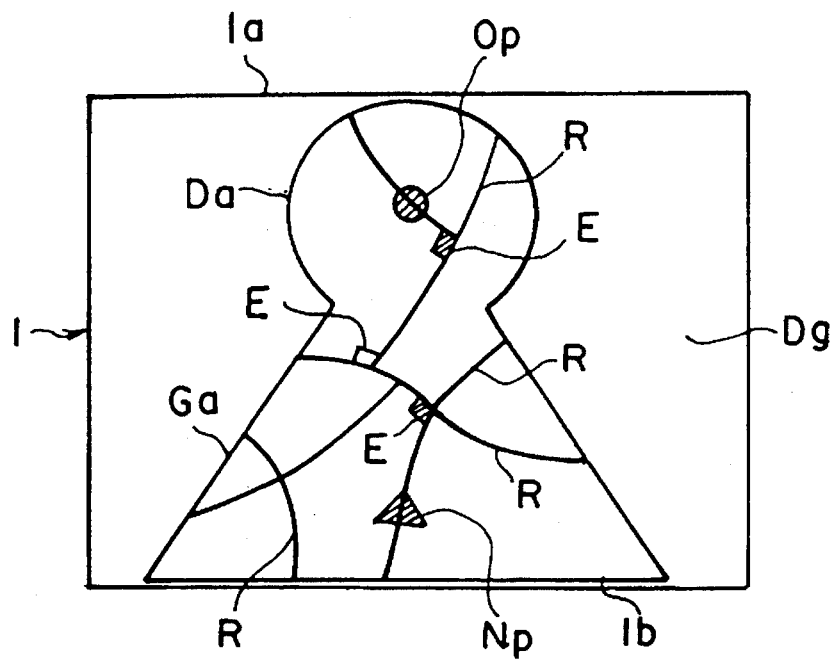
FIG. 3 is a front view showing a display example of the objective point according to the method of the present invention.
Figure 4:
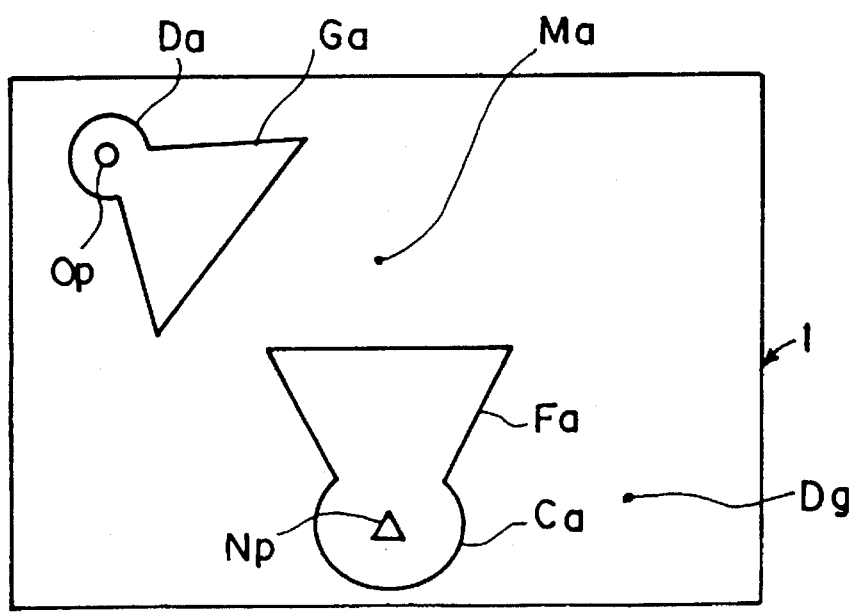
FIG. 4 is a front view showing a display example indicative of the relative relationship between the current point and the objective point according to the method of the present invention.
Figure 5:
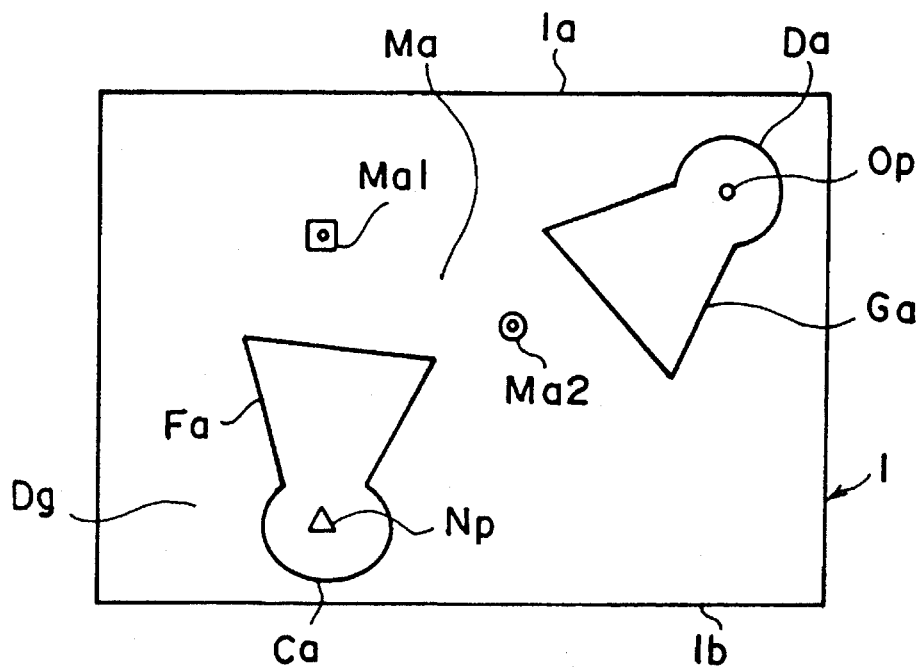
FIG. 5 is a front view showing another display example indicative of the relative relationship between the current point and the objective point according to the method of the present invention.
Figure 6:
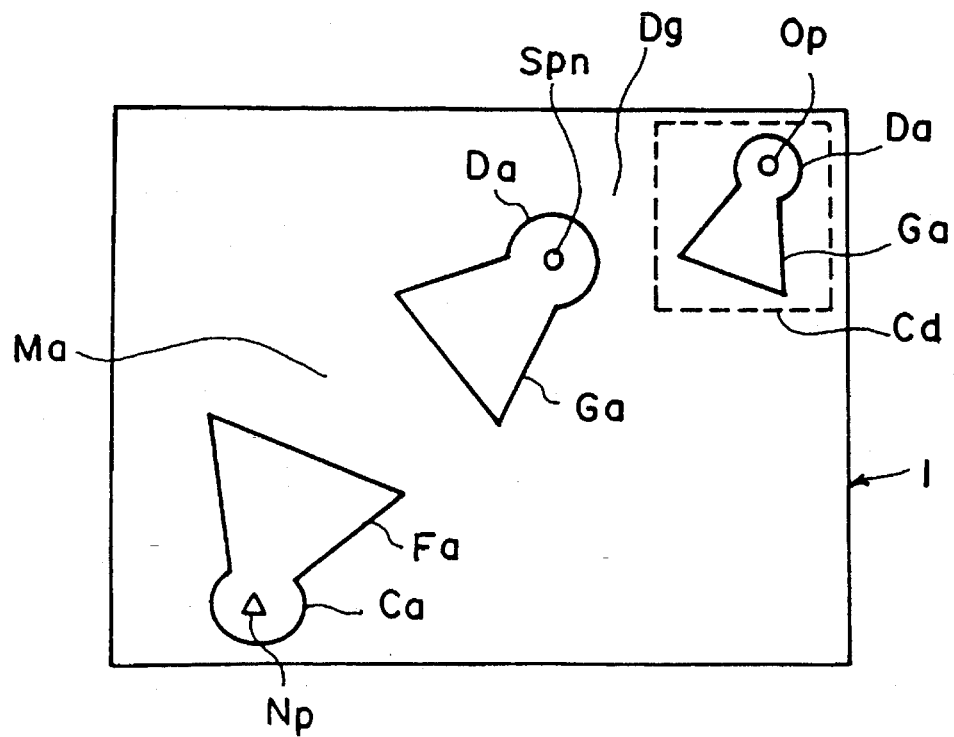
FIG. 6 is a front view showing still another display example indicative of the relative relationship between the current point and the objective point according to the method of the present invention.
Figure 7:
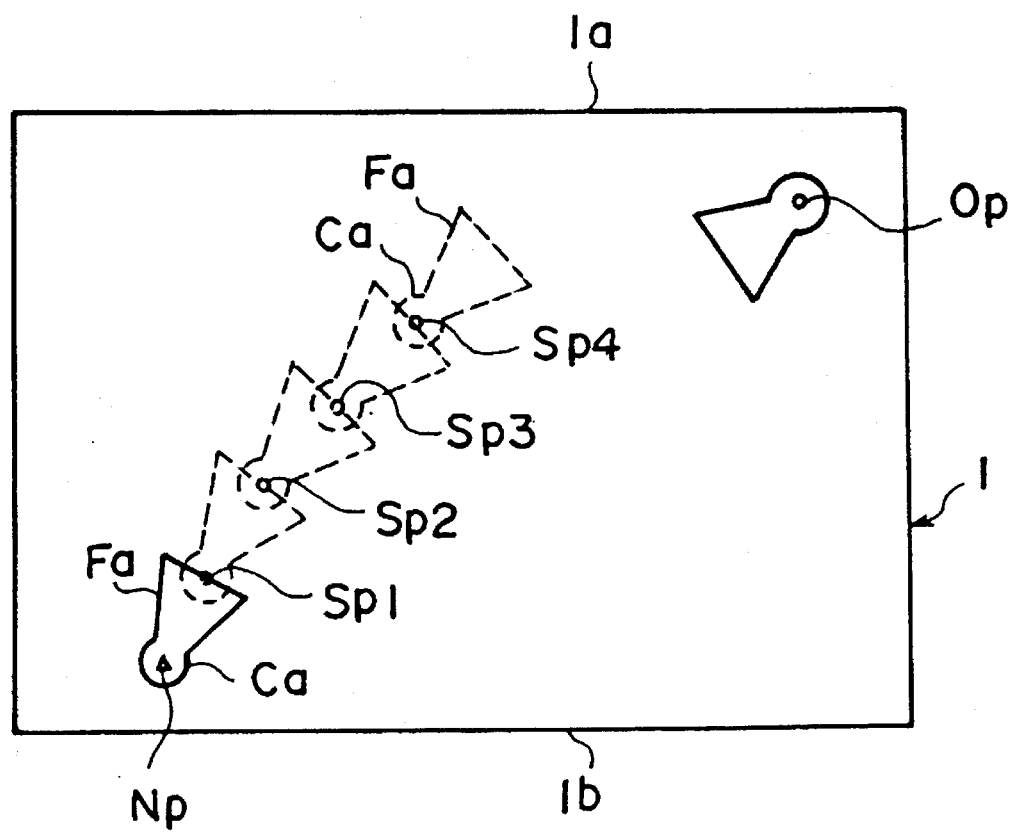
FIG. 7 is a front view showing one display example indicative of the relative relationship between the current point and the plurality of objective points.
Figure 9B:
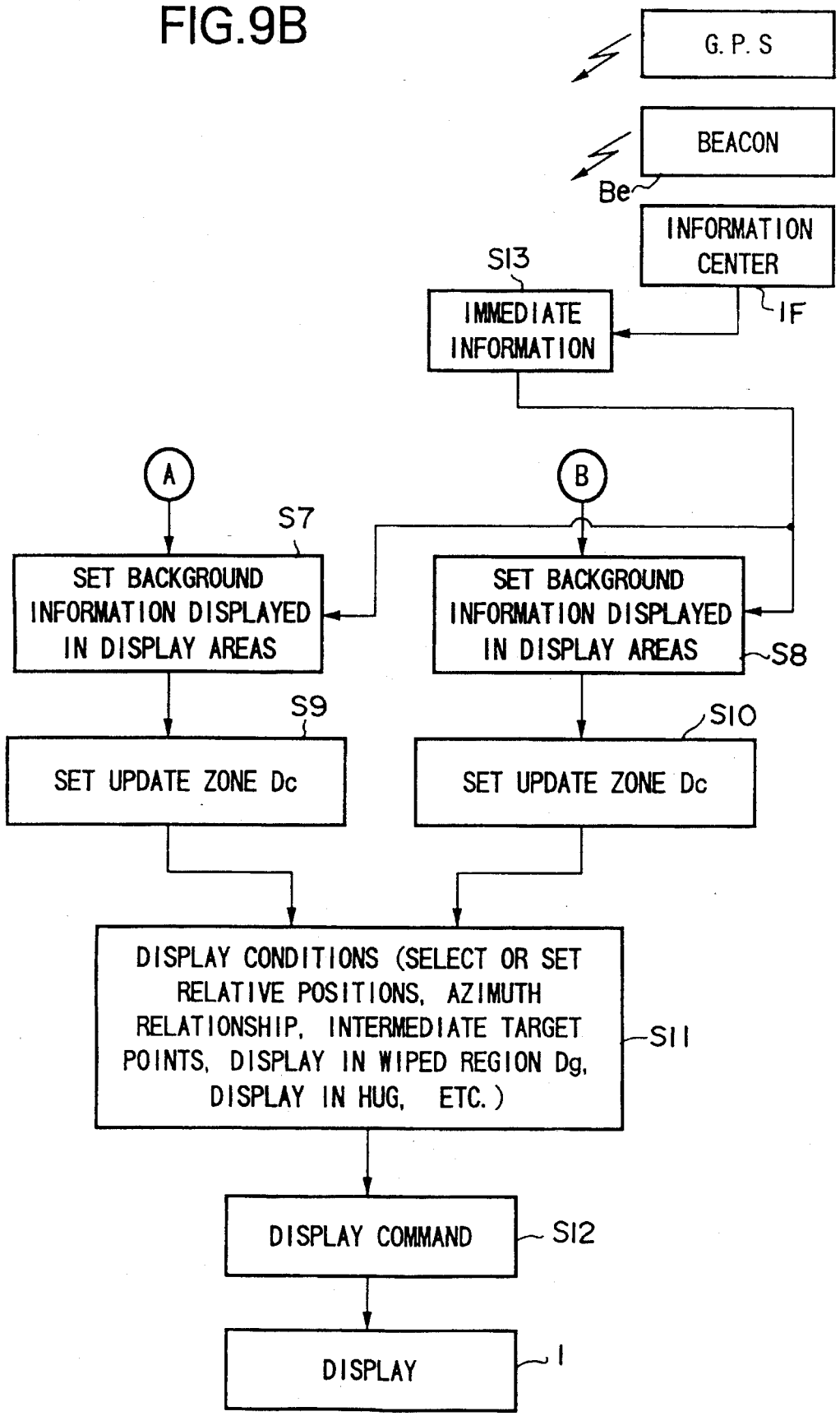
FIG. 9 is a flowchart showing one example of operation of the system shown in FIG. 8 in accordance with the method of the present invention.

Embodiments of the present invention will be hereinafter described with reference to the drawings. FIG. 1 is a front view showing a display example of the current point according to a method of the present invention, FIG. 2 is a front view showing one example in which the current point is moved and a displayed picture is updated, FIG. 3 is a front view showing a display example of the objective point according to the method of the present invention, FIG. 4 is a front view showing one display example indicative of the relative relationship between the current point and the objective point according to the method of the present invention, FIG. 5 is a front view showing another display example indicative of the relative relationship between the current point and the objective point according to the method of the present invention, FIG. 6 is a front view showing still another display example indicative of the relative relationship between the current point and the objective point according to the method of the present invention, FIG. 7 is a front view showing one display example indicative of the relative relationship between the current point and the plurality of objective points, FIG. 8 is a functional block diagram of one example of a system for practicing the method of the present invention, and FIG. 9 is a flowchart showing one example of operation of the system shown in FIG. 8 in accordance with the method of the present invention.

Figure 2:
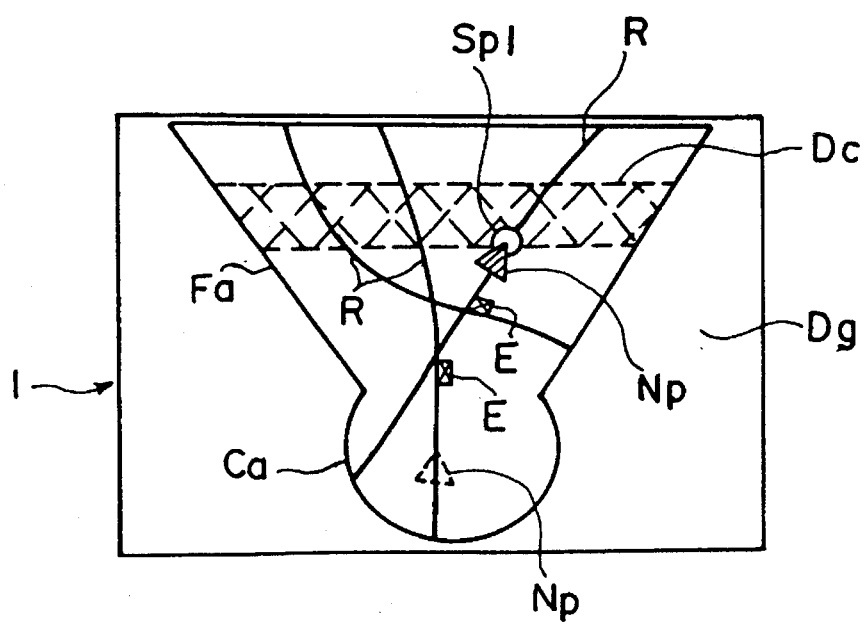
FIG. 2 is a front view showing one example in which the current point is moved and a displayed picture is updated.

In FIGS. 1 and 2, denoted by reference numeral 1 is a display screen of a liquid crystal or CRT for use with, e.g., a car navigation system (hereinafter abbreviated as CNS). In conventionally known CNS's, map or map information of a specified area has been displayed all over the area of the screen 1.

As described before, however, when map information of the specified area is displayed all over the area of the screen 1, it is difficult to read and recognize from the whole display the map information relating to the target or objective point, the current point, or points and areas surrounding both the points which will be possibly passed later.

As opposed to the above display mode in the known CNS's, the present invention employs a display mode below.

With a display method of the present invention, by way of example, the current point Np is set in a lower-half of the screen 1, specifically in a position that is spaced from a lower edge of the display screen 1 about ¼ of the vertical width thereof and is located substantially centrally of the horizontal width of the screen. Furthermore, there are set a display area Ca in the form of a small-diameter circle with the current point Np at the center, and a fan-shaped display area Fa which is spread substantially in the form of a fan from the display area Ca or the current point Np to the next target point $Sp_1$ (or the objective point Op).

While the circular display area Ca including the current point Np and the fan-shaped display area Fa are set on the display screen 1 so as to spread upwardly in FIG. 1, these display areas may be set on the display screen 1 so as to spread rightwardly (or leftwardly).

The present invention displays, in the display areas Ca, Fa set relating to the current point, necessary map information, such as main roads R and main equipment E, included in those areas. In other words, no information is basically displayed in a wiped area Dg outside both the display areas Ca, Fa.

Display of the map information, such as roads R and equipment E, in the two display areas Ca, Fa is carried out by, for example, calling the known map information, that is stored in an IC card, CD-ROM or the like in the digital form, in such an extent as corresponding to the full area of the display screen 1, and then applying a wiping pattern, a mask or the like to the called information corresponding to the outer wiped area Dg. This display mode enables map data used in the known CNS's to be utilized as it is.

In the above display mode, the current point Np is displayed such that a region where a driver will possibly pass on the way toward the next target point $Sp_1$ (or the objective point Op) is indicated by using a fan-shaped possibly passage area with such directivity as include the next target point. Thus, unnecessary map information, specifically, information about the area locating on the opposite side of the current point to the target point Sp (or the objective point Op), for example, is not displayed on the display screen 1. It is therefore very convenient for the driver to view the map information about the current point Np and the area that will be possibly passed later, or to set the next target point Sp during travel along the route.

As with the conventionally known CNS's, the current point Np set and displayed on the display screen 1 is moved progressively on the road R, selected in the two display areas Ca, Fa on the screen, in synchronism with travel of a motor vehicle. On the other hand, the first target point $Sp_1$ as viewed from the current point Np is set on the road R in the two display areas Ca, Fa displayed on the screen 1 of FIG. 1.

The target point $Sp_1$ is set in the display areas Ca, Fa displayed on the screen 1 of FIG. 1 to a position that is desirably spaced from a lower edge 1b of the screen 1 about ¾ of the vertical width of the screen (or from an upper edge 1a about ¼ thereof. When the current point Np is moved to reach the first target point $Sp_1$, the map information displayed on the screen 1 is scrolled so that the point $Sp_1$ becomes the next current point Np.

Thus, according to the display method of the present invention, a plurality of target points $Sp_2n$, including the first target point $Sp_1$, are set beforehand in sequence on the scheduled route until reaching the final objective point Op, so as to be successively displayed in the display areas Ca, Fa for the current point Np on the screen 1. Whenever the current point Np reaches each of the target points $Sp_1$ to $Sp_2n$ in the display areas Ca, Fa, the map information displayed on the screen 1 is updated successively.

On the other hand, the objective point Op is displayed as follows. During travel from the current point Np as the starting place to the final objective point Op, the target point $Spn_{+1}$ next to the immediate target point $Sp_1$ as viewed from the current point Np, which is updated successively updated with the travel, is displayed as the objective point Op at that time. As exemplified in FIG. 3, therefore, the final objective point Op (or the next target point $Spn_{+1}$) is set to be displayed in a position that is spaced from the upper edge $1a$ of the display screen 1 about ¼ of the vertical width thereof and is located substantially centrally in the horizontal direction. Furthermore, there are set a display area Da being circular with the point Op (or $Spn_{+1}$) at the center, and a display area Ga which is in the form of an inverted fan, i.e., has a fan-shape spreading downwardly from the display area Da with directivity corresponding to the direction in which the motor vehicle approaches. Then, map information, such as roads R and equipment E, about the region defined by both the display areas Da, Ga is displayed.

The reason of displaying a map of the objective point Op (or the next target point $Spn_{+1}$) as shown in FIG. 3 is to omit display of map information about the region where the motor vehicle will not possibly pass, taking into account the fact that the roads R approaching the objective point Op (or the target point Spn as viewed from the current point Np) are limited to some or considerable extent from the geographical relationship between the current point Np at the starting or intermediate place and the target point Spn as viewed from the current point Np (or the next target point $Spn_{+1}$ or the objective point Op).

The above-described display mode allows the driver to easily and promptly view and discriminate the objective or target point on the map display, and also to intuitively predict which road H leads to the objective point Op in a shorter distance or at the earlier time from the relationship to the current point Np just by looking at the display screen 1.

The positional relationship and the azimuthal relationship between the current point Np and the objective point Op (or the next target point $Spn_{+1}$) are displayed, by way of example, in a mode as shown in FIG. 4 according to the present invention. When the current point Np and the final objective point Op are relatively close to each other, the circular and fan-shaped display areas Ca, Fa with the current point Np at the center and the circular and fan-shaped display areas Da, Ga with the final objective point Op at the center are displayed including an intermediate portion Ma between both the points, as shown in FIG. 4, in such a manner as to visually recognize the positional relationship and the azimuthal relationship therebetween at a glance.

The azimuthal relationship between the two points Np and Op indicated by both the fan-shaped display symbols Fa, Ga is displayed in different ways depending on the reduced scales actually set for the display areas including both the points. More specifically, when the current point Np and the final objective point Op are relatively close to each other, the display symbols of both the points can be displayed on the same screen 1 on the same reduced scale. When the two points Np, Op are so far from each other that the display areas including these points cannot be displayed on the same reduced level, the region of the display symbols Da, Ga including the objective point Op is displayed on the further reduced scale, for example, so that the display areas including the two points Np and Op can be always displayed on the same screen 1. In such a case, the difference in respective reduced scales for display of both the display symbols is clearly indicated by, e.g., displaying those symbols in different colors or tones, or putting numerical values indicative of the reduced scales.

In the intermediate portion Ma between the two points Np and Op (or Spn), a simple figure representing a typical place or equipment at the middle point Ma may be displayed for purpose of allowing the driver to grasp the distance and the azimuth to the middle point Ma as viewed from the current point Np or the objective point Op (or the target point Spn). There is always present, for example, a bridge or a railroad crossing through which the drive must pass until reaching the objective point Op (or the next target point Spn), i.e., an absolute or inevitable passage point. Such a bridge or railroad crossing is displayed in an area of the intermediate portion Ma as indicated by Ma1, Ma2 in FIG. 5.

When the current point Np as the starting place and the final objective point Op are so far from each other that both the points Np and Op cannot be displayed on the same screen 1, the intermediate point locating in the same picture as the current point Np, i.e., the target point Spn, may be displayed instead of the objective point Op, as shown in FIG. 6, until coming close to the objective point Op. In this case, the display areas Da, Ga of the objective point Op may be displayed as a reference display Cd on a different reduced scale by utilizing the wiped region Dg in the displayed picture, as shown in FIG. 6. Alternatively, with the display method of the present invention, some of the plurality of target points $Sp_1$ to Spn set between the current point Np and the objective point Op may be displayed successively from a position near the display areas Ca, Fa of the current point Np (see FIG. 7). This display mode is advantageous in allowing the driver to roughly view and grasp the direction and the distance along the route from the current point Np to the target point ahead in several stages or the objective point Op.

The above-described display method of the present invention is carried out by using, e.g., a CNS apparatus having functional blocks shown in FIG. 8 in accordance with a flowchart shown, by way of example, in FIG. 9.

In FIG. 8, denoted by reference numeral 2 is an input unit for the current point Np, 3 is an input unit for the objective point Op or the target point Spn, and 4 is a central processing unit which comprises a processing section 4a, a storage section 4b, a retrieval section 4c and an arithmetic section 4a. The central processing unit 4 functions to process respective inputs from the two input units 2, 3 and then display the display areas Ca, Fa of the input current point Np and the display areas Da, Ga of the input objective point Op or target point Spn on the display screen 1 of a display unit 5.

The current point entered through the input unit 2 corresponds to the place where the driver is now present on the so-called analog map. The current point Np is usually automatically input by means of a map matching method, GPS, or a beacon for positional information. However, the current point Np may be input by using the address or name of that place, or the name of the equipment existing in that place, or a code indicative of the coordinates thereof. Then, along the route extending from the current point Np to the objective point Op, data of target points is input by setting the first target point $Sp_1$ closest to the current point Np, the second or next target point $Sp_2$, the third target point $Sp_3$ after next and so on in a like manner until the final objective point Op.

When the data of the current point Np and the first target point $Sp_1$ next to the current point Np, which point $Sp_1$ becomes the next current point when the current point Np reaches there, is set through the current point input unit, the input data is processed in the processing section 4a of the central processing unit 4, and data of map information stored in the storage section 4b is retrieved in the retrieval section 4c.

The retrieval section 4c retrieves and extracts the map information of a particular area including the data of the two points Np, $Sp_1$ from among the map information stored in the storage section 4b. The retrieved data is arithmetically processed in the arithmetic section 4d into image data which is output to the display unit 5. The display unit 5 displays a map in accordance with the image data on its screen 1 in the region of the display areas Ca, Fa. The resulting display corresponds to the map display of the current point Np and the first target point $Sp_1$ shown in FIG. 1.

After displaying the current point Np and the first target point $Sp_1$ shown in FIG. 1 along with the map information in the two display areas Ca, Fa as background, the current point Np moves on the road R as the motor vehicle mounting the system of the present invention is moved. This is the same as in the known CNS's. With the present invention, when the current point Np reaches the first target point $Sp_1$ in the display of FIG. 1, the map information on the screen is scrolled so that the first target point $Sp_1$ becomes the next current point Np.

After the scrolling, the first target point $Sp_1$ which has become the current point Np with movement of the motor vehicle and the next target point $Sp_2$ are displayed in the display areas Ca, Fa on the screen 1 in a similar manner as the current point Np and the first target point $Sp_1$ shown in FIG. 1. Thus, the current point Np and the plurality of target points $Sp_1$ to Spn are updated successively with movement of the motor vehicle. In actual travel of the motor vehicle, however, the relationship between the current point Np and the target points $Sp_1$ to Spn is not always such that the current point Np reaches the next target points $Sp_1$ to Spn in order.

For example, it happens sometimes that the driver desires to change the passage route because of unexpected situation such as suspension of traffic or traffic jams. According to the method of the present invention, when the moving current point Np reaches a display update area Dc shown in FIGS. 1 and 2 within the contour of the display areas Ca, Fa, the display is updated in principle at that time. But when the moving current point Np comes out of the display areas Ca, Fa, for example, on condition that the moving current point Np crosses the contour of the display areas, the display is updated with the crossed point as the current point Np such that the new current point Np upon change of the route is positioned substantially at the center of the circular display area Ca and the map information is displayed in the display areas Ca, Fa along with the next target point $Sp_2$ set in advance. Therefore, the driver can travel from the current point Np, which is reached after change of the route and newly displayed on the screen 1, toward the next target point $Sp_2$.

The above-described display method of the present invention is carried out following steps shown in the flowchart of FIG. 9. First, the system is turned on to start display operation in step S1. Then, the current point Np is automatically input in step S2 by a map matching method or by receiving a radio wave of GPS or a beacon for positional information. The current point Np may be manually input by using the address or name of that place, or the name of the equipment or the telephone number representing that place. Alternatively, the current point Np may be input through moving communication means, e.g., a medium used for such an information distributing service.

After completion of input setting of the current point Np as the stating place, the objective point Op and the route until reaching the objective point Op, i.e., the names of the roads R, etc. scheduled to pass and the plurality of target points $Sp_1$ to Spn set on the passage route at a proper pitch, are input in steps S3 and S4. As with the manual input of the current point Np, the target points $Sp_1$ to Spn are input by using the address or name of that place, or the name of the equipment or the telephone number representing that place. Alternatively, the plurality of intermediate target points $Sp_1$ to Spn until the objective point Op may be automatically set in order by utilizing an operation program for automatic route setting, for example, such that a typical intersecting point in each zone locating a proper certain distance ahead along the computed route, or a point locating on the route in the above zone and also within a preset display update zone is determined as the target point.

After the current point Np as the starting place, the plurality of target points $Sp_1$ to Spn as the passage points, and the final target point Op have been input in steps S2 to S4, the display sequence is set in the order of the passage points in step S5 so as to display the point representing the current point and one of points $Sp_1$ to Spn representing the next target point, e.g., the current point Np and the first target point $Sp_1$, the first target point $Sp_1$ and the second target point $Sp_2$ and so on, as map information as viewed from the current point in the display areas Ca, Fa successively over time with travel of the motor vehicle.

On the other hand, in sixth step S6, the display areas Da, Ga as viewed from the objective point are set in the order of the passage such that the third target point $Sp_3$ is set as the objective point Op in the relevant stage with the second target point $Sp_2$ as the current point, the fourth target point $Sp_4$ is set as the objective point Op in the relevant stage with the third target point $Sp_3$ as the current point, and so on.

After the display areas Ca, Fa viewing the target or objective point from the current point side and the display areas Da, Ga viewing the current point from the target or objective point have been set as described above, the kinds of map information, such as the names of the roads, places and equipment, to be displayed in the display areas Ca, Fa and the display areas Da, Ga in the respective display stages are set in steps S7 and S8.

In ninth and tenth steps S9, S10, the update zone Dc is set as one example of condition for updating the map information displayed in the display areas Ca, Fa, Da, Ga corresponding to the respective display stages. In eleventh step S11, display conditions are set so as to display relative positions of the current point Np and the objective point Op (or the next target point Spn) and the azimuthal relationship between both the display areas in the form of a fan and an inverted-fan on the same screen in a switching manner by using symbol figures set in steps S5, S6, or display map information in the wiped region Dg on the screen 1 or in a head-up display (HUD).

In twelfth step S12, a display command is input for the displayed information and the display conditions set in the above step, while specifying the display areas Ca, Fa of the current point Np and so on. In response to the display command, the map information from the current point Np to the objective point Op is displayed on the screen 1 while automatically or manually updating the displayed information in the respective display areas.

At this time, if there is map data set to display the inevitable passage points such as Ma1, Ma2 in the intermediate portion Ma between the display symbol figures Ca, Fa of the current point Np and the display symbol figures Da, Ga of the objective point Op, the data of the inevitable passage points such as Ma1, Ma2 is also displayed in synchronism with the symbol figures displayed in relative relation in step S11. Reduced scales of the map information input in steps S5, S6 are processed depending on the preset display mode, for example, such that the difference in reduced scale between the display symbol figures Ca, Fa and Da, Ga may be recognized by, e.g., classification using different colors or tones, or by indicating numerical values.

In thirteenth step S13, when the system for practicing the method of the present invention is designed as a CNS system capable of receiving or transmitting and receiving real time information or data, traffic immediate information about suspension of traffic or traffic jams or accidents is received from an information center IF, an installed beacon Be or the like. The received information or data is transmitted, as indicating change in situations in the current point Np and the target points Spn or the areas including these points, to the setting sequences in steps S7 and S8 so that colors of the roads displayed in the display areas Ca, Fa, Da, Ga are changed, or the information is displayed by using a preset simple symbol, or a sign, e.g., a blanking spot, indicative of change in situations is displayed in the display areas Ca, Fa, Da, Ga and the intermediate portion Ma therebetween.

When the region of the display areas is subject to traffic control or the like, the fan-shaped display symbol can be varied in its directing angle with the aid of a radio electric wave. In this case, the display areas previously set in steps S5, S6 are changed automatically or optionally through transmission and reception of data to and from the information center.

According to the display method of the present invention, as described above, when a driver travels from the current point as the starting place to the final objective point via intermediate set areas including a plurality of target points, necessary and sufficient map information is displayed along with, as needed, the relative positional relationship and the azimuthal relationship useful for the driver to judge the traveling direction from the current point and/or the approaching direction toward the objective point. Therefore, the following advantages are resulted.

Since map information about the rough route from the current point to the objective point is displayed such that the region around the current point and extending therefrom with particular directivity is set as a region through which the driver will pass from now, and the map information in this region is displayed in display areas each having a preset specific shape, the driver can promptly and precisely view, discriminate and/or grasp the road through which motor vehicle will pass with a high possibility, the equipment along the road, or the target point.

Also, since map information in the direction in which the motor vehicle is approaching the next target point or the objective point, including the road extending with directivity corresponding to the approaching direction, is displayed in display areas each having a preset specific shape, the driver can easily and promptly view and grasp the position where the motor vehicle is now present, as viewed from the objective or target point just by looking at the displayed map.

Thus, with the display method of the present invention, the current point and the objective or target point are displayed along with map information relating to the limited region through which the driver will possibly pass, i.e., the display areas extending with particular directivity about both the points, including roads, equipment and the names of the equipment locating therein. Therefore, as opposed to display of the route in the form of a line determined by the conventional automatic route setting, for example, the driver can visually confirm and grasp the route that is scheduled to travel, including a plurality of other routes along which the driver may travel depending on change in situations. This can provide the driver with a traveling support while promoting voluntary dispersion of the traffic.

With the display mode according to the method of the present invention, even if the CNS system has no such additional functions as voice guide or display of intersection points and thereabout in an enlarged scale, the driver can grasp the necessary map information comparably or superior to the CNS system having such additional functions. Also, the burden imposed on the driver to view the displayed map information is reduced corresponding to a reduction in the amount of information presented, allowing the driver to recognize the information with more ease. Accordingly, the display method of the present invention greatly contributes to simplification of the structure, reduction in the cost, and easier operation of the CNS itself.

Further, when traffic information for CNS's that has been put into service recently is utilized in the CNS employing the display method of the present invention, it is possible to promptly and easily judge the necessity of changing the travel route in the display areas according to the present invention or set another route if the route is to be changed, by matching only the traffic information that is directly related to the areas displayed on the screen with the map information displayed by the present method, and then taking in and displaying that traffic information in real time.

With the present invention as described above, taking a car navigation system (CNS) as an example, since display of excessive information is avoided and the map information necessary and sufficient for the driver to move from the current point to the objective point is displayed, it is possible to simplify the CNS itself and ensure easy understanding of display simultaneously.

Further, with the present invention, information can be displayed in such a separate manner as to display the background information on the screen of a console and only the symbol figures of the current point and the target or objective point in an HUD to show the relative relationship. If the driver is experienced in update rules (setting conditions) of displayed information, even only display in the HUD can give the driver an effective driving support with such a feeling of security that his or her recognition or understanding is not wrong. In this case, by displaying the symbol figures including the plurality of target points until the objective point successively or simultaneously during a stop or at any desired time, the driver can recognize the rough route or direction from the current point to the objective point in the form of patterns and can precisely memorizing it as an image.

According to the display method of the present invention, navigation display of off-road areas including road and waterways can be performed for motor vehicles, such as Hovercrafts or off-road motor vehicles, which travel on the surface of the water, roadless terrain, marshy ground, etc., in addition to roads. The reason is that while the conventional CNS's are designed to display roads primarily as necessary information on the premise that moving bodies travel along limited roads, the display method of the present invention displays information about a predetermined area, which includes the target point or the objective point and extends with particular directivity, in the corresponding display areas. Therefore, by displaying the points where even Hovercrafts or off-road motor vehicles cannot pass and the dangerous zones to be avoided, for example, in the region displayed in the display areas beforehand in the form of blocks or spots, the display method of the present invention can be utilized to effect navigation under such a situation by allowing the driver himself or herself to voluntarily select the portion through which the Hovercraft or the off-road motor vehicle can pass, as a passageway or a route and to travel therealong.

In addition, with the display method of the present invention, map information about a space in the water, air, universe or the like can be displayed two-dimensionally in a like manner to the above-described embodiment. It is also expected that the display method of the present invention can be applied to navigation display effective for a three-dimensional space by setting an area as a three-dimensional frame with directivity and displaying three-dimensional background information in the set display frame with the aid of three-dimensional graphics and cubic holography. For a three-dimensional space through which a moving body travels with no viewability in usual manners, by way of example, as experienced in the front visual field of the moving body traveling at a superhigh speed, in the dark visual field, or in operation of a minute robot using the microtechnology, by displaying background information in the above three-dimensional frame depending on characteristics of a traveling capability of the moving body, the pilot of the moving body who cannot in fact directly view actual information surrounding him or her can take a measure for safety or eliminate a feeling of unrest during operation of the moving body.

What is claimed is:

1. A map display method wherein, when displaying a map of a desired area on a display screen of a liquid crystal display or CRT, the current point and the target or objective point, are displayed such that a display area for the current point is defined by a circular region having a predetermined radius and a fan-shaped region which spreads at a predetermined central angle from the current point toward the target or objective point and has substantially the form of a fan or an inverted-triangle, map information included in said display area of the current point being displayed on said display screen, and a display area for the target or objective point is defined by a circular region having a predetermined radius and an inverted-fan-shaped region which spreads at a predetermined central angle from the target or objective point toward the current point and has substantially the form of an inverted-fan or a triangle, map information included in said display area of the target or objective point being also displayed on said display screen.

2. A map display method according to claim 1, wherein in the fan-shaped region of said display area, a scheduled passage point, including a road, spaced from the current point by a predetermined distance is displayed substantially centrally in the fan-shaped region of said display area on a side of the display area nearer to an outwardly spreading edge of the fan-shaped region.

3. A map display method according to claim 2, wherein said scheduled passage point to be displayed is a point determined by any of: the name of a main building, the name of a main equipment, the name of a place, and an address.

4. A map display method according to claim 1, wherein in the fan-shaped region of said display area, a main road which can be reached from the current point, is spaced from the current point by a predetermined distance and forms part of a route toward the target or objective point is displayed to pass substantially centrally in the fan-shaped region of said display area on a side of the display area nearer to an outwardly spreading edge of the fan-shaped region.

5. A map display method according to claim 4, wherein said main road to be displayed is determined depending on road width, number of lanes, or whether a road faces a main equipment.

6. A map display method according to claim 1, wherein at least road width, name of the road, name of the equipment facing the displayed road, name of place, and details of road control are displayed selectively or together among the displayed information in different display modes from each other.

7. A map display method according to claim 6, wherein:

a picture of said display area of the current point is updated on condition that the moving current point moves beyond a certain position preset in said display area of the current point;

the fan-shaped region and the inverted-fan-shaped region of said display areas are directed vertically or horizontally; and the positional relationship between the current point and the target or objective point is displayed on said display screen by using a fan-shaped display symbol and an inverted-fan-shaped display symbol.

8. A map display method according to claim 1, wherein in the inverted-fan-shaped region of said display area, a scheduled passage point, including a road, spaced downstream of the target or objective point by a predetermined distance is displayed substantially centrally in the inverted-fan-shaped region of said display area on a side of the display area nearer to an outwardly spreading edge of the fan-shaped region.

9. A map display method according to claim 1, wherein in the inverted-fan-shaped region of said display area, a main road which is spaced downstream of the target or objective point by a predetermined distance and forms part of a route toward the objective point is displayed to pass substantially centrally in the inverted-fan-shaped region of said display area on a side of the display area nearer to an outwardly spreading edge of the fan's target region.

10. A map display method according to claim 1, wherein a picture of said display area of the current point is updated on condition that the moving current point moves beyond a certain position preset in said display area of the current point.

11. A map display method according to claim 1, wherein the fan-shaped region and the inverted-fan-shaped region of said display areas are directed vertically or horizontally.

12. A map display method according to claim 1, wherein the positional relationship between the current point and the target or objective point is displayed on said display screen by using a fan-shaped display symbol and an inverted-fan-shaped display symbol.

13. A method of displaying a map on a display screen comprising the steps of:
- (a) identifying a route between a current point and an objective point on a map to be displayed;
- (b) displaying on the display screen a first area of the map that includes the current point, the displayed first area being a circular region of predetermined radius and a fan shaped region that spreads from the circular region at a predetermined angle from the identified route along which the current point is expected to move towards the objective point; and
- (c) displaying on the display screen a second area of the map that includes the objective point, the displayed second area being a circular region of predetermined radius and an inverted fan shaped region that spreads from the second area circular region at a predetermined angle from the identified route along which the current point is expected to move towards the objective point.

14. The method of claim 13 wherein a scheduled passage point, including a road, is substantially centrally displayed in the fan shaped region of the first area on a side of the display area nearer to an outwardly spreading edge of the fan shaped region.

15. The method of claim 14 wherein the scheduled passage point is a point determined by any of: the name of a main building, the name of a main equipment, the name of a place, and an address.

16. The method of claim 13 wherein a main road which can be reached from the current point is substantially centrally displayed in the fan shaped region of the first area on a side of the display area nearer to an outwardly spreading edge of the fan shaped region.

17. The method of claim 13 wherein a scheduled passage point, including a road, is substantially centrally displayed in the inverted fan shaped region of the second area on a side of the display area nearer to an outwardly spreading edge of the inverted fan shaped region.

18. The method of claim 13 wherein a main road which forms part of a route to the objective point is substantially centrally displayed in the inverted fan shaped region of the second area on a side of the display area nearer to an outwardly spreading edge of the inverted fan shaped region.

19. A method of displaying a map on a display screen comprising the steps of:
- (a) identifying a route between a current point and an objective point on a map to be displayed; and
- (b) displaying on the display screen a first area of the map that includes the current point and the objective point, the displayed first area being a circular region of predetermined radius and an inverted fan shaped region that spreads from the circular region at a predetermined angle from the identified route along which the current point is expected to move towards the objective point, the objective point being displayed in the circular region and the current point being displayed in the inverted fan shaped region.

* * * * *